May 30, 1939.　　　A. STUBBS　　　2,160,687

PLURAL MOTOR CONTROL SYSTEM

Filed Nov. 4, 1937　　　3 Sheets-Sheet 1

Inventor:
Albert Stubbs,
by Harry E. Dunham
His Attorney.

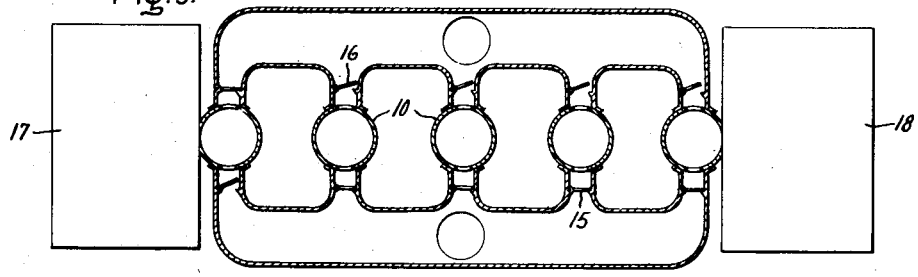
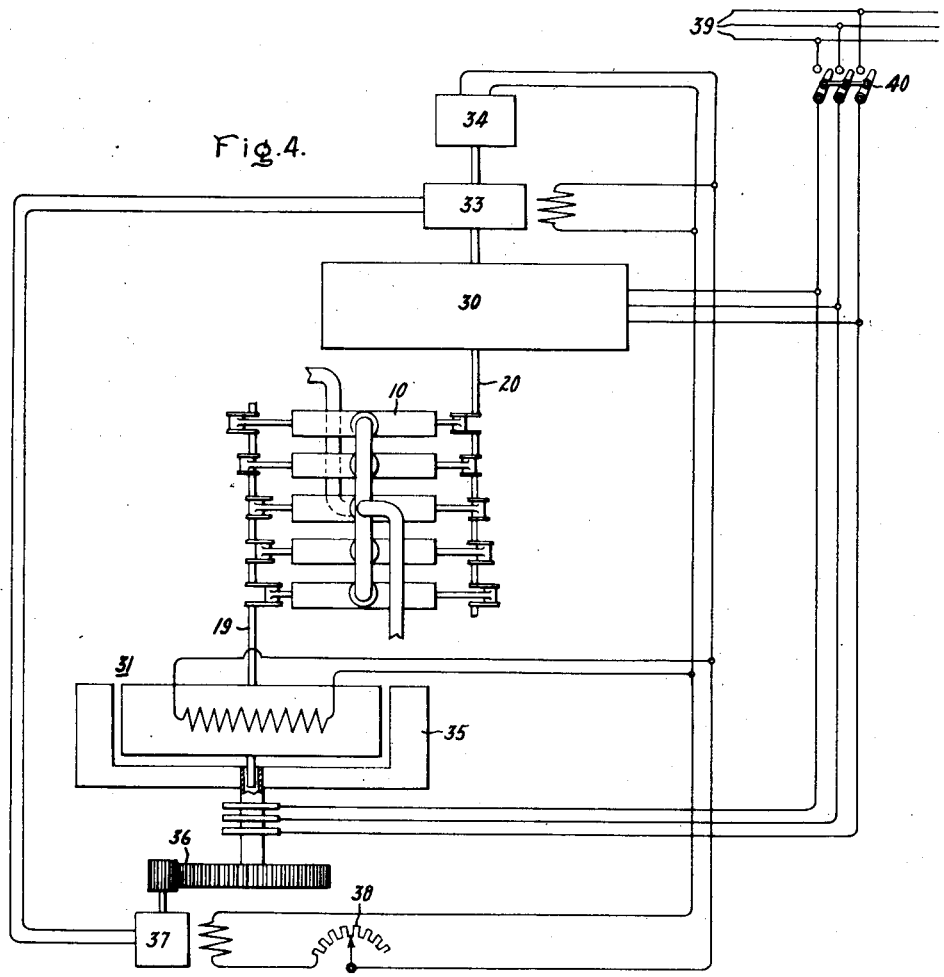

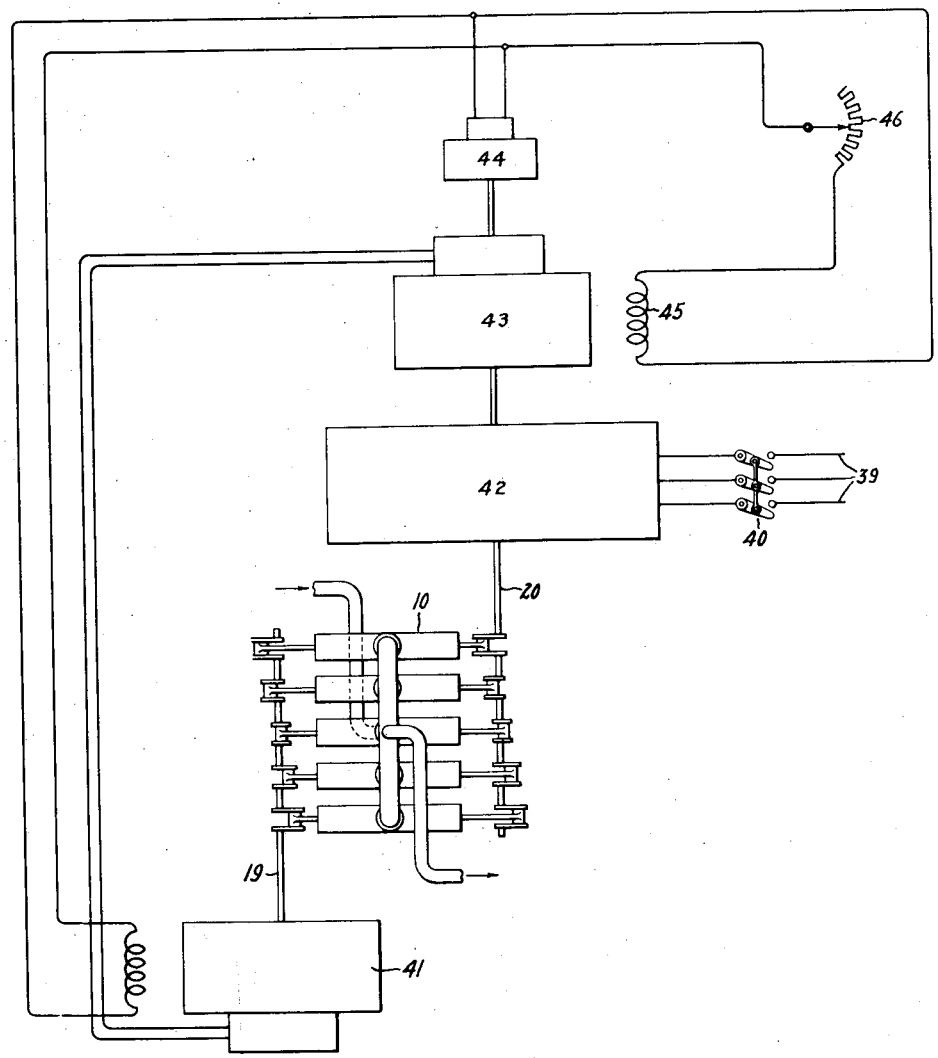

Patented May 30, 1939

2,160,687

UNITED STATES PATENT OFFICE 2,160,687

PLURAL MOTOR CONTROL SYSTEM

Albert Stubbs, Knutsford, England, assignor to General Electric Company, a corporation of New York Application November 4, 1937, Serial No. 172,810
In Great Britain November 2, 1936

2 Claims. (Cl. 172—293)

The present invention relates to control arrangements for pumping systems and more particularly for pumping systems of the kind having two shafts adapted to rotate at a variable phase angle with each other.

Such pumps of the kind referred to are employed in modern steam power plants in which the steam generators are of small water capacity usually of the direct contact type in which superheated steam, having a presure in the vicinity of from 1200 to 2000 pounds per square inch, comes into direct contact with the water to be converted into steam. In such generators the water may be sprayed into the steam or alternatively the water may be contained in tubes through which the steam is bubbled. Owing to the small water capacity of the generators it is essential to maintain the supply of water to the generator proportionate with the amount of steam required by the power plant, and this supply has to be fed to the generator against the very high pressures above mentioned. In power plants of this kind, owing to the high pressure in the generators, reciprocating feed pumps are used to feed the water to the generators.

In one arangement the reciprocating pump comprises a multiplicity of cylinders located side by side in each of which pistons are arranged in pairs, the pistons of any one pair being arranged to work in a cylinder common to both pistons. Each cylinder is provided with one inlet and one outlet valve while all the inlet valves lead to the input pipe coming from a suitable source of supply and the delivery valves all lead to a common delivery pipe feeding the steam generator. One piston of each pair of pistons is connected to one crank shaft and the other piston of each pair is connected to a second crank shaft, the two shafts being driven by suitable engines. Mechanical means are provided for varying the phase angle between these two shafts.

It is the object of this invention to provide arrangements for controlling the supply of feed water to the steam generators in which the reciprocating pumps are operated under substantially equal and constant speed whatever be the amount of feed water required, but it will be understood that the invention is not solely applicable to such feed water supply systems.

Figure 1:
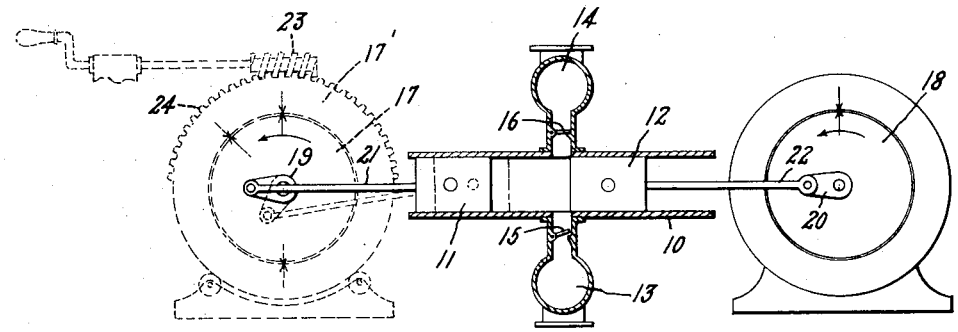
Figure 2:
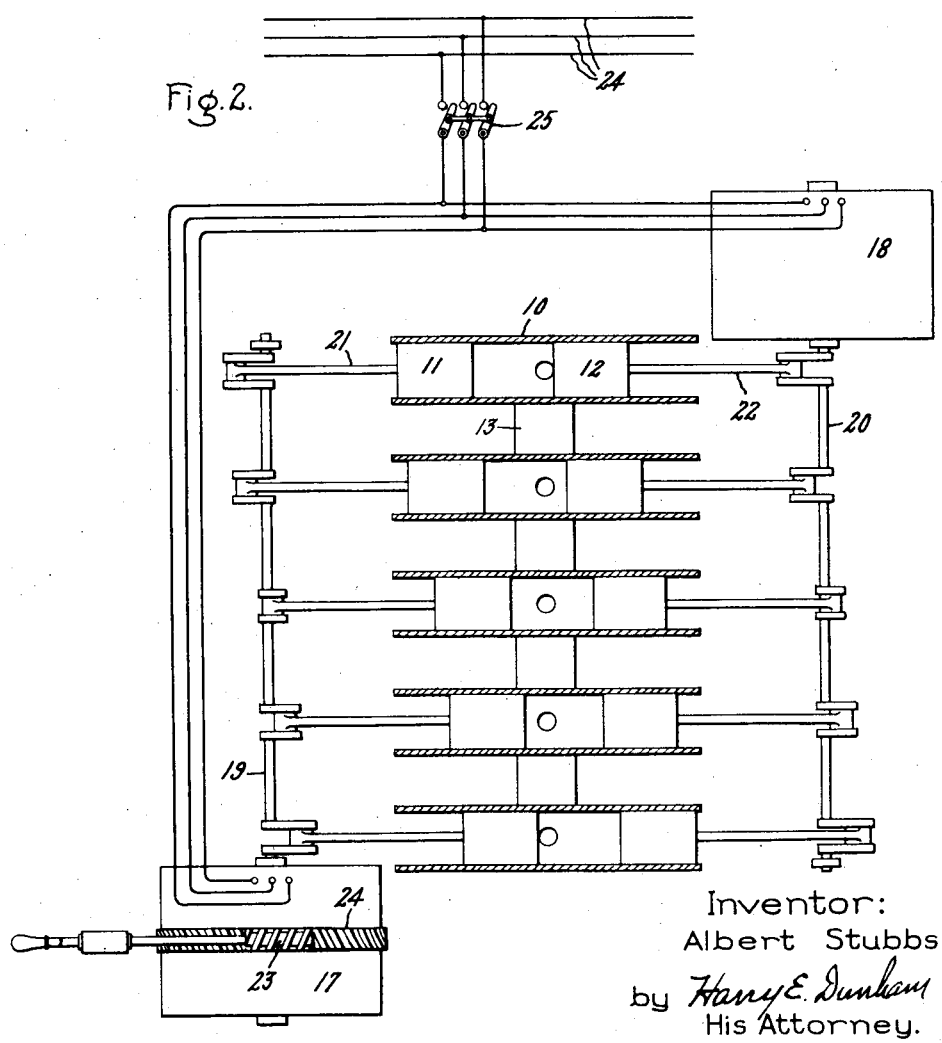

Fig. 1 is a front elevation, partly in section, through one cylinder of the pump; Fig. 2 is a plan view of one modification embodying the invention; Fig. 3 is a side view of the apparatus showing the arrangement of the pump manifolds with respect to the cylinders; Fig. 4 shows another modified arrangement embodying the invention; while Fig. 5 discloses still another modification of the invention.

Referring to Figs. 1 and 2, of the drawings, one form of the invention is shown schematically in which the reciprocating pump comprises cylinders 10 provided with opposed pistons 11 and 12. Inlet and outlet ports 13 and 14 respectively are provided in the central section of the cylinder 10 for the passage of the feed water to and from the pumping mechanism, suitable one way valves 15 and 16 being provided in the feed and exhaust conduits respectively. The opposed pistons are coupled to motors 17 and 18 through crank shafts 19 and 20 and connecting rods 21 and 22 respectively.

In this modification of the invention one of the motors may be provided with a movable stator which may be shifted by any suitable means to cause an out of phase relationship with respect to the other motor. As shown in Fig. 1, the motor 17 is provided with a movable stator 17' which may be rotated manually by any suitable means such as the worm gear mechanism 23 operatively associated with the cooperating gear 24 provided on the stator 17'. While in the embodiment shown, the stator is shifted manually, it is of course understood that the stator may be shifted automatically by means responsive to the water level in the steam generator or the steam pressure therein. It is understood of course that the movable stator must be moved to the in phase position before the starting switch for the motors is closed so that the motors may be brought up to speed with no load on the pump mechanism.

The two motors may rotate the two shafts in the same or in opposite directions. When the two rotors are in phase or 180° out of phase, depending upon whether the rotors are rotating in the same or opposite directions, there will be no relative displacement between the pistons of a pair, but when the phase angle between the rotors has a value between 0° and 180° relative displacement betwen the two pistons of a pair takes place producing a pumping action to deliver water to the steam generator connected to the outlet port of the pump. Though the pump may have but one cylinder, when a multiplicity of cylinders 10 are used, the corresponding pistons of the several pairs are displaced relatively to one another as shown in Fig. 2 so as to obtain a more constant delivery of the feed water to the steam generator.

In the arrangement shown in Figs. 1 and 2 each of the two crank shafts 19 and 20 is driven by an alternating current synchronous motor 17 and 18, respectively, in the same direction, both motors being fed from the same source of supply 24 through a common switching device 25. When the two motors are switched into circuit they will speed up together and will be maintained in synchronism with one another by the motion of the feed pump systems; since, if one of the motors lags behind the other work will be done on the lagging motor by the leading motor tending to bring the lagging motor into phase with the leading motor. Both motors will increase in speed until they are finally in synchronism with the alternating current supply system. When there is no relative displacement between the pistons no supply of water is delivered to the steam generator.

The rotors of both motors may furthermore be supplied with exciting current from an excitor secured to or driven from one of the motor shafts and starting may be effected by closing a main switch common to both motors. If desired, to prevent too sudden or great a kick, starting may be effected by means of auto transformers connected to the stator feed circuits. In this latter case each stator circuit is provided with a starting switch and one motor is run up to the synchronous speed before the other is switched in.

In order to obtain a supply of feed water the movable stator 17' of the motor 17 is rotated through an appropriate angle with respect to the stator of the other motor in order to bring the two rotors out of phase with each other. Such a position is indicated by dotted lines in Fig. 1 in which the stator has been rotated approximately 45° in a counterclockwise direction from the in phase position shown in full line. With the shifting of the stator, the rotor will accordingly be moved out of phase with respect to the rotor of motor 18 and the pump piston 11 driven by the rotor of motor 17 will also be operated out of phase with respect to piston 12. Due to the relative displacement between the pistons of each pair in the various cylinders, a pumping action will take place thereby delivering water to the steam generator. The maximum delivery to the steam generator will be when the two rotors are 180° out of phase with each other.

The load on the pump is closely related to the relative displacement on the stators of the synchronous motors, and the amount of this displacement may therefore be utilized as an indication of the quantity of water being fed to the steam generator. In one practical arrangement an indicator disc is rotatably mounted on a shaft and is driven from the movable stator by means of a flexible cable connection. A separate starting switch is included in each of the feed circuits of the synchronous motors so that each motor may be started separately, and it is arranged that the starting switch of the synchronous motor for the fixed stator cannot be closed until the indicator, and consequently the movable stator, is in the no load position. Furthermore, it is arranged that the two starting switches are interlocked so that the starting switch of the motor with the movable stator cannot be closed until the starting switch of the motor with a fixed stator is closed, but the protection devices are arranged to trip both starting switches simultaneously. In operation, the movable stator is first moved to its no load position and then the starting switch of the motor having the fixed stator is closed. When the two motors are running at synchronous speed with the alternating current supply, the switch of the motor having the movable stator is closed. The delivery of the pump is then controlled by rotating the movable stator through the requisite angle, an indication of which is given on the indicator disc.

It will be understood that the two crank shafts may be arranged to rotate in opposite direction, in which case the maximum delivery by the pump will be when the phase angle between the crank shafts is zero.

In Fig. 4 is shown another alternative arrangement in which a squirrel cage motor 30 drives one of the crank shafts 20 of the pump and a synchronous motor 31 drives the other pump crank shaft 19. The regulating system includes a direct current generator 33 and an excitor 34 therefor secured to the shaft of the squirrel cage motor 30. In order to compensate for the slip of the rotor of the motor 30 under load, the stator 35 of the synchronous motor is adapted to be rotated through suitable gearing 36 by a suitable direct current auxiliary or pony motor 37 which is supplied with electric current from the generator 33 in a Ward-Leonard system, the excitor 34 of which supplies the fields of the auxiliary motor 37 and synchronous motor 31 as well as the direct current generator 33. It is arranged that the speed of the stator of the synchronous motor can be varied from zero to about two percent of the synchronous speed of the synchronous motor, which two percent corresponds to the maximum allowable slip of the rotor of the motor 30 with respect to the rotating field thereof. When the pumps are working at their maximum delivery the slip of the motor will be greatest and its speed lowest. The auxiliary motor must therefore be working at its maximum speed to rotate the stator 35 of the synchronous motor in a direction opposite to that of the alternating current rotating field of the synchronous motor. With a drop in speed of the squirrel cage motor, the voltage applied to the armature of the auxiliary motor 37 is reduced with a corresponding increase in speed to rotate the stator of the synchronous motor.

Alternatively a slip ring induction motor may be used in place of the squirrel cage motor.

The degree of relative displacement of the pistons of each pair is obtained by varying the step or phase angle between the rotors of the squirrel cage and synchronous motors in any suitable manner, such as by means of the adjustable series resistance 38 in the field circuit of the auxiliary motor 37. It is obvious that this resistance may be controlled automatically by means responsive to the water level or steam pressure in the steam generator. As described in the preceding embodiment of the invention, the stators of the two motors driving the pump crank shafts are supplied from a source of alternating current 39 of suitable frequency and number of phases through a common switch 40.

In a still further alternative arrangement shown in Fig. 5 one pump crank shaft may be driven by a direct current motor 41 and the other by an alternating current motor 42 in which arrangement the output of the pump is regulated through the direct current motor. If a source of direct current is available for connection to the direct current motor its speed may be controlled by any well-known means such as a rheostat in its field circuit. The arrangement shown in Fig. 5, however, is designed for use where a direct current source of supply is not available and a direct current generator 43 and an excitor 44 are provided on the shaft of the alternating current motor 42 which drives one of the pump shafts. The excitor 44 supplies excitation current both to the direct current motor 41 which drives the motor pump shaft and to the direct generator 43. The direct current generator acts as a source of supply for the direct current motor 41. The output of the feed pump is regulated by controlling the field 45 of the direct current generator by means of a series rheostat 46. This rheostat may in turn be regulated either manually or by means responsive to the level of the water in the steam generator or the steam pressure therein. It is, of course, understood that the output of the feed pump may as well be regulated by controlling the field of the direct current motor 41 in a similar manner. If the field of the generator 43 is to be regulated automatically in the manner suggested above, then when the level of the water in the steam generator drops, the rheostat is adjusted so as to add resistance to the exciting circuit of the generator thereby decreasing the existing field current with consequent decrease in the voltage of the direct current generator. The effect of this regulation will be to cause the alternating current motor to take up load and in so doing the direct current motor 41 also takes up load. When the water level in the steam generator rises, the resistance is cut out from the exciting circuit of the generator with a consequent increase in the existing field thereof and a drop in the supply of feed water to the steam generator.

Whether or not an excitor dynamo be employed, the regulation as stated above may be carried out on the field of the direct current motor 41. In this case, when the water in the steam generator drops, resistance in the field circuit of the motor is cut out with consequent increase in field excitation and decrease in speed, thus causing a variation in phase angle between the two pump shafts. Consequently the alternating current motor 43 will take up load and in so doing the direct current motor 41 will also take up load.

If desired, during low loads, the pump may be run at a lower speed than for high loads and for this purpose the alternating current motor may be adapted to run at two different speeds by providing it with suitable windings.

Having described my invention together with the apparatus which I now consider to represent the best embodiment thereof, I desire to have it understood that the apparatus shown is only illustrative and that the invention may be carried out by other means.

What I claim as new and wish to secure by Letters Patent of the United States is:

1. A driving arrangement for a pair of shafts which are to be operated in selective phase relationship comprising an alternating current induction motor for operating one of said shafts, a synchronous motor for operating the other of said shafts, said synchronous motor provided with a rotatable stator, means for rotating the rotor of said synchronous motor in phase with said induction motor comprising an auxiliary motor for rotating the stator of said synchronous motor, and means for adjusting the speed of said auxiliary motor.

2. A driving arrangement for a pair of shafts, means for operating said shafts in selective phase relationship comprising an alternating current induction motor for operating one of said shafts, a direct current generator driven by said induction motor, means including a direct current motor connected to said generator for controlling the operation of the other of said shafts, an exciter driven by said induction motor for furnishing excitation current for both said generator and said direct current motor.

ALBERT STUBBS.